United States Patent
Haas

(10) Patent No.: US 6,590,600 B2
(45) Date of Patent: Jul. 8, 2003

(54) METHOD AND APPARATUS FOR CONTROLLING EXPOSURE AMPLITUDE AND PRINTED TRACK WIDTH BY PULSE WIDTH MODULATION

(75) Inventor: Daniel D. Haas, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/810,786

(22) Filed: Mar. 16, 2001

(65) Prior Publication Data

US 2002/0191070 A1 Dec. 19, 2002

(51) Int. Cl.$^7$ .............................. B41J 2/47; B41J 2/405
(52) U.S. Cl. ...................................... 347/252; 347/144
(58) Field of Search .............................. 347/237, 240, 347/247, 251, 252, 253, 254, 232, 239, 255, 144; 369/112, 116, 239

(56) References Cited

U.S. PATENT DOCUMENTS

| | | | |
|---|---|---|---|
| 4,375,064 A | 2/1983 | Ohara | 347/251 |
| 5,241,328 A | 8/1993 | Sarraf et al. | 347/232 |
| 5,266,973 A | 11/1993 | Sanger | 347/237 |
| 5,291,221 A | 3/1994 | Sanger et al. | 347/234 |
| 5,323,179 A | 6/1994 | Sanger et al. | 347/237 |
| 5,737,300 A | * 4/1998 | Ota et al. | 369/112 |
| 5,874,981 A | 2/1999 | Haas et al. | 347/187 |
| 6,011,575 A | * 1/2000 | Haneda | 347/238 |
| 6,060,208 A | 5/2000 | Wang | 430/201 |
| 6,396,792 B1 | * 5/2002 | Ichihara | 369/116 |

* cited by examiner

*Primary Examiner*—Hai Pham
(74) *Attorney, Agent, or Firm*—Nelson Adrian Blish

(57) ABSTRACT

Exposure of a medium is controlled by changing an emission level of a radiation source from a first power to a second power. The second power emits for less time than required by an irradiance profile to traverse a full-width at half maximum of the irradiance profile projected onto the medium along a direction of relative motion between the irradiance profile and the medium. The emission level changes to the first power emits for less time than required by the irradiance profile to traverse the full-width at half maximum of the irradiance profile projected onto the medium along the direction of relative motion between the irradiance profile and the medium. Then the emission level changes to the second power. Brief pulsing of a single binary source can transfer intermediate amounts of thermally transferable colorant from a donor exhibiting a continuous-tone transfer response.

11 Claims, 10 Drawing Sheets

METHOD AND APPARATUS FOR CONTROLLING EXPOSURE AMPLITUDE AND PRINTED TRACK WIDTH BY PULSE WIDTH MODULATION

FIELD OF THE INVENTION

This invention relates to a method and apparatus for non-impact printing in general and more specifically to printing with scanning light beams on laser-thermal dye transfer medium using pulse width modulation.

BACKGROUND OF THE INVENTION

Pulse-width modulation, and pulse-number modulation, may be applied to various types of radiation sources used in non-impact printers: radiation sources incapable of emitting intermediate amounts of radiation, or radiation sources whose emissions do not attain consistent amplitudes; or radiation sources whose control is more easily or less expensively accomplished by pulse modulation rather than by amplitude modulation. Pulse-number modulation is described in Col. 2, Lines 9–19, of U.S. Pat. No. 4,375,064:

"the total optical energy applied to a picture element, i.e., the exposure H, is defined by the following expression:

$$H = N \cdot \Delta h$$

where $\Delta h$ is the optical energy which is applied to a photo-sensitive material by the semiconductor laser in response to one high frequency pulse and N is the number of high-frequency pulses (pulse number) which are provided according to the level of an input video signal for the picture element."

Note that the original symbols E and $\Delta e$ in this quotation have been changed to H and $\Delta h$, respectively, in order to conform to the nomenclature used in the remainder of this document. U.S. Pat. No. 4,375,064 modifies pulse-number modulation to produce pulse-width modulation in Col. 3, Lines 28–34, and its FIG. 3C by generating a single pulse whose duration of activation encompasses all of the pulses of an equivalent pulse-number modulated optical output. Even though the explanation of pulse-number modulation and FIG. 2 of U.S. Pat. No. 4,375,064 rely upon exposure in units of (energy per unit area) to attain a density level, the "Summary of the Invention" states in Col. 3, Lines 52–54, that its object is "to provide a signal with which a light beam is subjected to binary modulation to record an image having half-tones", not continuous-tone images. The "Description of the Preferred Embodiments" specifies in Col. 4, Lines 25–29, that "It is desirable that the recording sheet . . . be a silver salt or electronic type which is capable of producing half-tones and is sensitive to the wavelength (red or infrared) of the semiconductor laser beam." U.S. Pat. No. 4,375,064 never mentions the important roles of the optical output's irradiance profile on the image-recording medium and of the scanning speed in determining: the actual exposure deposited an any single location on that medium; and whether the resulting image is a halftone of binary density distribution or a continuous tone of many controlled density levels.

Pulse-width modulation is applied to laser-thermal imaging in commonly assigned U.S. Pat. No. 5,241,328 to improve "the linearity of the tone scale" in the Abstract. Printing of an intermediate density is accomplished in Col. 2, Lines 46–51, by an "LDCL circuit" which "immediately drives the laser from a threshold near-on value to an optimum 'full-on' condition, and then leaves the laser full-on, for a time corresponding to the weighted digital value of that respective binary word" and then reduces the laser to a threshold near-on value by Col. 6, Lines 8–9, and Claim 1, sufficiently low to not transfer further colorant as inferred from the zero density for both the pulse-width modulated and the amplitude modulated tonescales at the lower right corner of FIG. 5 and Col. 8, Lines 10–12 of U.S. Pat. No. 5,241,328. The fact that the pulse-width modulated tonescale curve attains the same image density as the horizontally sloped saturation regime of the amplitude-modulated tonescale curve at high exposure (the upper left corner of the graph of the image-recording medium's exposure response in FIG. 5 of U.S. Pat. No. 5,241,328) implies that the laser power during the pulsed exposures is great enough that an exposure lasting longer than the time for the writing spot to traverse its own full-width at half maximum attains the medium's saturated density level. In the Abstract, the apparatus scans "a finely focused spot of light from the laser along a line", but the linkage between the size of that spot and its scanning speed in determining whether a halftone or a continuous-tone image results is not discussed U.S. Pat. No. 6,060,208 uses pulse-width modulation to produce the visual semblance of intermediate image densities by superimposing a rudimentary line halftone upon an externally supplied halftone image at a spatial scale finer than the lines per inch at which that supplied halftone is encoded. "Pulsing a laser" exposes binary donors "creating tiny gap areas in the coverage of the colorant . . . much smaller than the screen dot . . . while operating in the saturation portion of the transfer function for the colorant" according to the Abstract and reiterated in Col. 2, Lines 46–51, in Col. 4, Lines 37–47, and again in Claim 1, to produce intermediate densities less than would be produced by uniformly deposited colorant in the image. The experiment reported in Col. 6, Lines 18–28, notes, "The spot size of the laser or other energy source used to transfer colorant from a donor to the substrate is typically a significant fraction of the area of each pixel. Therefore, one cannot simply turn off the laser (or other energy source) for 2% of the time to produce the desired apparent optical density of the deposited colorant. Varying duty cycle of a laser in a laser color proofer in the range of about 50% to about 80% can provide a useful range of apparent optical densities in some cases." U.S. Pat. No. 6,060,208 does not teach a reason why the spot size of the laser precludes use of a 2% off-pulse to reduce image density, or how to predict the actual duty cycle that would be required to produce a desired exposure or density. The consequences of scanning speed for pulse duration and beam size are not discussed.

The first three embodiments of commonly assigned U.S. Pat. No. 5,874,981 are specifically stated in Col. 4, Lines 38–45, and references to $T_{traverse}$, to complete exposure deposition by one pulse of the source in less time than its beam requires to traverse its own width on the donor. The second three embodiments encompass pulse durations longer than $T_{traverse}$. U.S. Pat. No. 5,874,981 uses shaped pulses in addition to simple binary pulses of the exposing light to exploit intrinsic characteristics of laser-thermal dye transfer to obtain desirable tonescales in the consequent images while simplifying the electronic control of the light sources in Col. 2, Lines 34–38. Neither reproduction of desired exposure profiles nor adjustment of exposure deposited by multiple sources are stated as objects of this patent.

Multiple-source printers produce better image quality and reduced artifacts when all of the sources are matched to deposit identical exposure profiles generating identical image densities with identical spatial extent. This matching of exposure profiles deposited by all sources in a multiple-source printhead is sometimes called "printhead balance." Imbalance of a printhead can produce undesirable streaking artifacts in its printed images because some scanlines are darker than others. The mechanism of creating some scanlines darker than others on a continuous-tone image-recording medium might be simply the difference in that medium's response to some sources emitting different powers than other sources in that printhead. Commonly assigned U.S. Pat. No. 5,266,973 measures the powers of individual sources in the printhead in response to a sequence of electrical currents applied during calibration, then rescales the currents encoding the image sent to each laser, eliciting the same power from each of the sources in order to impose balance during printing. Balance is attained when all of the lasers are adjusted to produce the same image densities over the same spatial extent in the image-recording medium within an acceptable tolerance. Commonly assigned U.S. Pat. No. 5,291,221 and commonly assigned U.S. Pat. No. 5,323,179 apply a sequence of electrical currents while exposing the intended image-recording medium, then measure the image densities produced on that medium, and rescale the currents encoding the image to elicit the same image density during printing.

Printhead imbalance can produce streaking artifacts in halftones, even when printing on binary image-recording medium that produces one density when the exposure remains below an imaging threshold and a second density at any location receiving exposure exceeding that threshold. As illustrated in FIG. 1 for two exposure profiles deposited on a binary image-recording medium by the same irradiance shape but produced by twice the power from the source on the left as on the right, the lateral extent of the exposure profile exceeding the density-change threshold is wider for greater source power. The local density at the center of the exposure profile deposited by the lower power is the same as the local density at the center of the exposure profile deposited by the higher power due to the binary response of the image-recording medium. But since the lateral extent of the density change increases for the higher power, and the lateral extent of unchanged image density decreases, the density corresponding to the area-averaged transmittance or reflectance of an imaged area wider than the distance between successive pulsed exposures produced by the higher powered source differs from that produced by the lower powered source.

U.S. patent application Ser. No. 09/283,068 for the common assignee entitled "Modulator for Optical Printing" states in Lines 14–21 of Page 11:

In a further feature of the present invention, the amount of light deposited by each pixel at the media plane can be controlled, and therefore balanced, by adjusting the pulse width of the voltage applied to each individual pixel during a line printing time. There would need to be a calibration of the pixels before printing in order to determine the pulse width for each pixel. In this way, a more uniform printing by the entire array of pixels would result. This provides a means to correct for reasonable non-uniformities in the illuminations, the electrodes, the coatings and the crystal.

Its Claim 10 states:

A modulator according to Claim 1, wherein a pulse width of a voltage applied to each pixel of said electrode is adjustable to balance light levels during printing.

U.S. Pat. application Ser. No. 09/283,068 does not distinguish between pulses of shorter duration than the time for a writing-spot center on the image-recording medium to traverse its own full-width at half maximum (FWHM) and pulses longer than that FWHM traversal time. If the "light levels", i.e., instantaneous powers emitted by the light sources, are not adjusted in amplitude but only binary modulated, balancing the deposited exposure among multiple sources in a printhead depends upon the relative duration of the pulse compared to the FWHM traversal time.

It is desirable to provide a printer capable of producing an amplitude modulated exposure profile by applying binary modulation to a radiation source. It is desirable to produce an intermediate density on an image recording medium exhibiting a continuous-tone density response to exposure, such as photograghic film. It is desirable to transfer intermediate amounts of colorant from a laser-thermal donor. It is also desirable to provide this capability while avoiding undesirable gaps in the image density profile. It is also desirable to provide a means for controlling the width of exposure profiles and consequently image tracks by pulse width modulation of a radiation source using pulses shorter than FWHM transversal time. It is further desirable to match the exposure profiles produced by a plurality of sources in a multiple-source printhead by applying binary modulation to those sources.

SUMMARY OF THE INVENTION

Briefly, according to one aspect of the present invention a method of controlling exposure of a medium comprises the step of changing an emission level of a radiation source from a first power to a second power. The second power emits for less time than required by an irradiance profile to traverse a full-width at half maximum of the irradiance profile projected onto the medium along a direction of relative motion between the irradiance profile and the medium. The emission level changes to the first power and emits less time than required by the irradiance profile to traverse the full-width at half maximum of the irradiance profile projected onto the medium along the direction of relative motion between the irradiance profile and the medium, then changes the emission level to the second power.

The irradiance profile projected by the light source onto the image-recording medium can reproduce a desired exposure profile in that image-recording medium by extinguishing that light source before the exposure reaches its infinite-duration limit $H[t_{off}\text{-}t_{on} \rightarrow \infty]$. That infinite-duration limit for the exposure is determined by the light beam's irradiation profile on the image-recording medium and by the amount of time required for any point on that beam's irradiance profile to scan a distance on the image-recording medium equal to that irradiance profile's full width at half maximum. This ability to enable a binary light source to imitate an amplitude-modulated source can be exploited in apparatus needing adjustability of the apparent amplitude and width of the light source, such as a multiple-source printhead with power variation among sources.

When a light source is pulsed to emit a constant power for a duration shorter that the time required for the irradiance profile to traverse its full width at half maximum (FWHM) along the scanning direction projected by that light source on an image-recording medium, the amplitude of the local exposure deposited on that image-recording medium is controlled by the duration of that pulse. Brief pulses of a binary-modulated source can deposit exposure profiles on the image-recording medium indistinguishable for the purposes of imaging from those that amplitude modulation of that light source could have deposited. Pulsing of a single binary source for durations shorter than the irradiance-FWHM traversal time can deposit graded amounts of exposure, producing intermediate image densities on a medium exhibiting a continuous-tone transfer response. Transfer of intermediate amounts of colorant from more than one laser-thermal donor can be accumulated in dot-on-dot printing described in commonly assigned U.S. Pat. No. 5,309,246 to produce halftone dots of "special" colors differing in appearance from the color obtained with a single donor. This capability of pulse-width modulation to control the amplitude of the deposited exposure can be used to adjust multiple binary sources emitting different powers in a printhead in order to cause them to deposit equal exposure profiles by pulsing each source for the compensating duration, while avoiding an artifactual gap in the image density of each subpixel.

One advantage of this invention over prior art is the capability of producing an amplitude modulated exposure profile by only applying binary modulation to an irradiation source, while avoiding undesired gaps in the image-density profile that might otherwise be needed to produce graded image density by means of halftoning on a spatial scale finer than the pixels of the original image. A second advantage of this invention is the ability to control the width of exposure profiles and consequent image tracks by pulse width modulation of a binary-modulated source using pulses shorter than the irradiance-FWHM traversal time. In a multiple-source printhead, binary modulation to equalize the exposure profiles offers the possibility of reducing the number of connections and simplifying the control devices for binary modulation, and enables the possibility of exposure balance for printheads incapable of amplitude modulating some sources independently of the other sources. The relatively wider irradiance profile full-width at half maximum specified for amplitude modulation of the exposure profile by binary modulation of the source is usually easier to attain in a printer and exhibits larger depth of focus than the narrow irradiance profile required for producing halftones with gaps in image-density change within each subpixel of the original image.

The present invention exploits the recognition of two regimes of exposure profiles available by pulse-width modulation of a binary modulated light source: contone and halftone. The criterion for demarcating these two regimes is the relative duration of the pulse compared to the time for the irradiance profile on the image-recording medium to traverse its own full-width at half maximum. This criterion can be restated in the distance domain as the relative distance scanned by the center of the irradiance profile on the image-recording medium during the pulse compared to the irradiance profile's full-width at half maximum. Wider beams and briefer pulses are used to adjust the amplitude of exposure profiles and the width of image tracks than would be required for halftoning on a scale finer than the printer's subpixels. Image-density gaps finer than the printer's subpixels are not needed to improve uniformity of the printing with a binary modulated radiation source.

Maintaining the pulse width shorter than the irradiance-FWHM traversal time can control the width transverse to the scanning direction of a region in which the deposited exposure exceeds a threshold exposure required by an image-recording medium to undergo a transformation; track width cannot be modified significantly by modulation in the halftone regime with pulses longer than the irradiance-FWHM traversal time.

The present invention is also useful in printing on silver-halide film and paper; and in illumination for input-scanning readers; and in integrated circuit manufacture, more specifically in ablative transfer of chemicals for doping or depositing upon a semiconductor or other substrate. A specific application is described for multiple-source printers or illuminators.

DETAILED DESCRIPTION OF THE INVENTION

Figure 1:
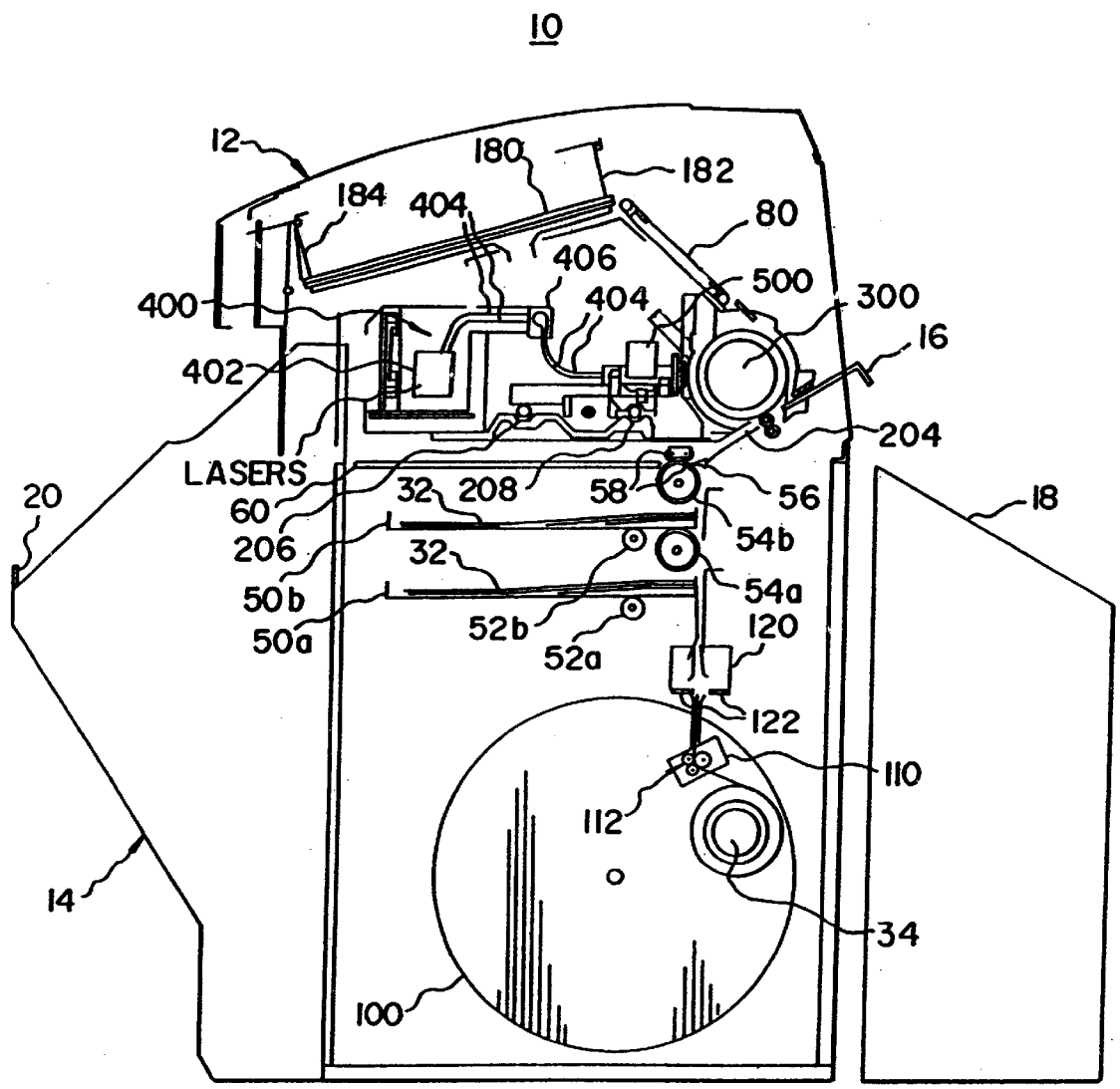
FIG. 1 is an elevational view in vertical cross section of an image forming apparatus of the present invention.

Referring to FIG. 1, there is illustrated an image forming apparatus 10 according to the present invention having an image processor housing 12, which provides a protective cover. A movable, hinged image processor door 14 is attached to the front portion of the image processor housing 12 permitting access to the two sheet material trays, lower sheet material tray 50a and upper sheet material tray 50b, that are positioned in the interior portion of the image processor housing 12 for supporting thermal print medium 32 thereon. Only one of the sheet material trays will dispense the thermal print medium 32 out of its sheet material tray to create an intended image thereon; the alternate sheet material tray either holds an alternative type of thermal print medium 32 or functions as a back up sheet material tray. In this regard, the lower sheet material tray 50a includes a lower media lift cam 52a for lifting the lower sheet material tray 50a and ultimately the thermal print medium 32, upwardly toward a rotatable, lower media roller 54a and toward a second rotatable, upper media roller 54b which, when both are rotated, permits the thermal print medium 32 to be pulled upwardly towards a media guide 56. The upper sheet material tray 50b includes an upper media lift cam 52b for lifting the upper sheet material tray 50b and ultimately the thermal print medium 32 towards the upper media roller 54b, which directs it towards the media guide 56.

The movable media guide 56 directs the thermal print medium 32 under a pair of media guide rollers 58, which engages the thermal print medium 32 for assisting the upper media roller 54b in directing it onto the media staging tray 60. The media guide 56 is attached and hinged to the lathe bed scanning frame 202 in FIG. 2 at one end, and is uninhibited at its other end for permitting multiple positioning of the media guide 56. The media guide 56 then rotates its uninhibited end downwardly, as illustrated in the position shown, and the direction of rotation of the upper media roller 54b is reversed for moving the thermal print medium receiver sheet material 32 resting on the media staging tray 60 under the pair of media guide rollers 58, upwardly through an entrance passageway 204 and around a rotatable vacuum imaging drum 300.

A roll of colorant donor material 34 is connected to the media carousel 100 in a lower portion of the image processor housing 12. Four rolls are used, but only one is shown for clarity. Each roll includes a colorant donor material 34 of a different color, typically black, yellow, magenta and cyan. These colorant donor materials 34 are ultimately cut into colorant donor sheet materials and passed to the vacuum imaging drum 300 for forming the medium from which colorants imbedded therein are transferred to the thermal print medium 32 resting thereon, which process is described in detail herein below. In this regard, a media drive mechanism 110 is attached to each roll of colorant donor material 34, and includes three media drive rollers 112 through which the colorant donor material 34 of interest is metered upwardly into a media knife assembly 120. After the colorant donor material 34 reaches a predetermined position, the media drive rollers 112 cease driving the colorant donor material 34 and the two media knife blades 122 positioned at the bottom portion of the media knife assembly 120 cut the colorant donor material 34 into colorant donor sheet materials. The lower media roller 54a and the upper media roller 54b along with the media guide 56 then pass the colorant donor sheet material onto the media staging tray 60 and ultimately to the vacuum imaging drum 300 and in registration with the thermal print medium 32 using the same process as described above for passing the thermal print medium 32 onto the imaging drum 300. The colorant donor sheet material now rests atop the thermal print medium 32 with a narrow gap between the two created by microbeads imbedded in the surface of the thermal print medium 32.

A laser assembly 400 includes several lasers 402. Diode lasers within the laser assembly are connected via fiber-optic cables 404 to a distribution block 406 and ultimately to the printhead 500. They can be individually modulated to supply energy to selected areas of the thermal print medium in accordance with an information signal. The printhead 500 includes a plurality of optical fibers coupled to the diode lasers at one end and at the opposite end to a fiber-optic array within the printhead. The printhead is movable relative to the longitudinal axis of the imaging drum. The printhead 500 directs thermal energy received from the lasers, causing the colorant donor sheet material to transfer the desired colorant across the gap to the thermal print medium 32. The printhead 500 in FIG. 1 is attached to a lead screw 250 in FIG. 2 via the lead screw drive nut 254 and drive coupling (not shown in FIG. 1 or 2) for permitting movement axially along the longitudinal axis of the imaging drum 300 for transferring the data to create the intended image onto the thermal print medium 32.

For writing, the imaging drum 300 rotates at a constant velocity, and the printhead 500 begins at one end of the thermal print medium 32 and translates along the entire length of the thermal print medium 32 for completing the transfer process for the particular colorant donor sheet material resting on the thermal print medium 32. After the transfer process, the colorant donor sheet material is then removed from the imaging drum 300 and transferred out the image processor housing 12 via a skive or ejection chute 16. The colorant donor sheet material eventually comes to rest in a waste bin 18 for removal by the user. The above described process is then repeated for the other three rolls of colorant donor materials 34.

After the colorants from all four sheets of the colorant donor materials has been transferred and the colorant donor materials have been removed from the vacuum imaging drum 300, the thermal print medium 32 is removed from the vacuum imaging drum 300 and transported via a transport mechanism 80 to a color binding assembly 180. The entrance door 182 of the color binding assembly 180 is opened for permitting the thermal print medium 32 to enter the color binding assembly 180, and shuts once the thermal print medium 32 comes to rest in the color binding assembly 180. The color binding assembly 180 processes the thermal print medium 32 for further binding the transferred colors on the thermal print medium 32 and for sealing the microbeads thereon. After the color binding process has been completed, the media exit door 184 is opened and the thermal print medium 32 with the intended image thereon passes out of the color binding assembly 180 and the image processor housing 12 and comes to rest against a media stop 20.

Figure 2:
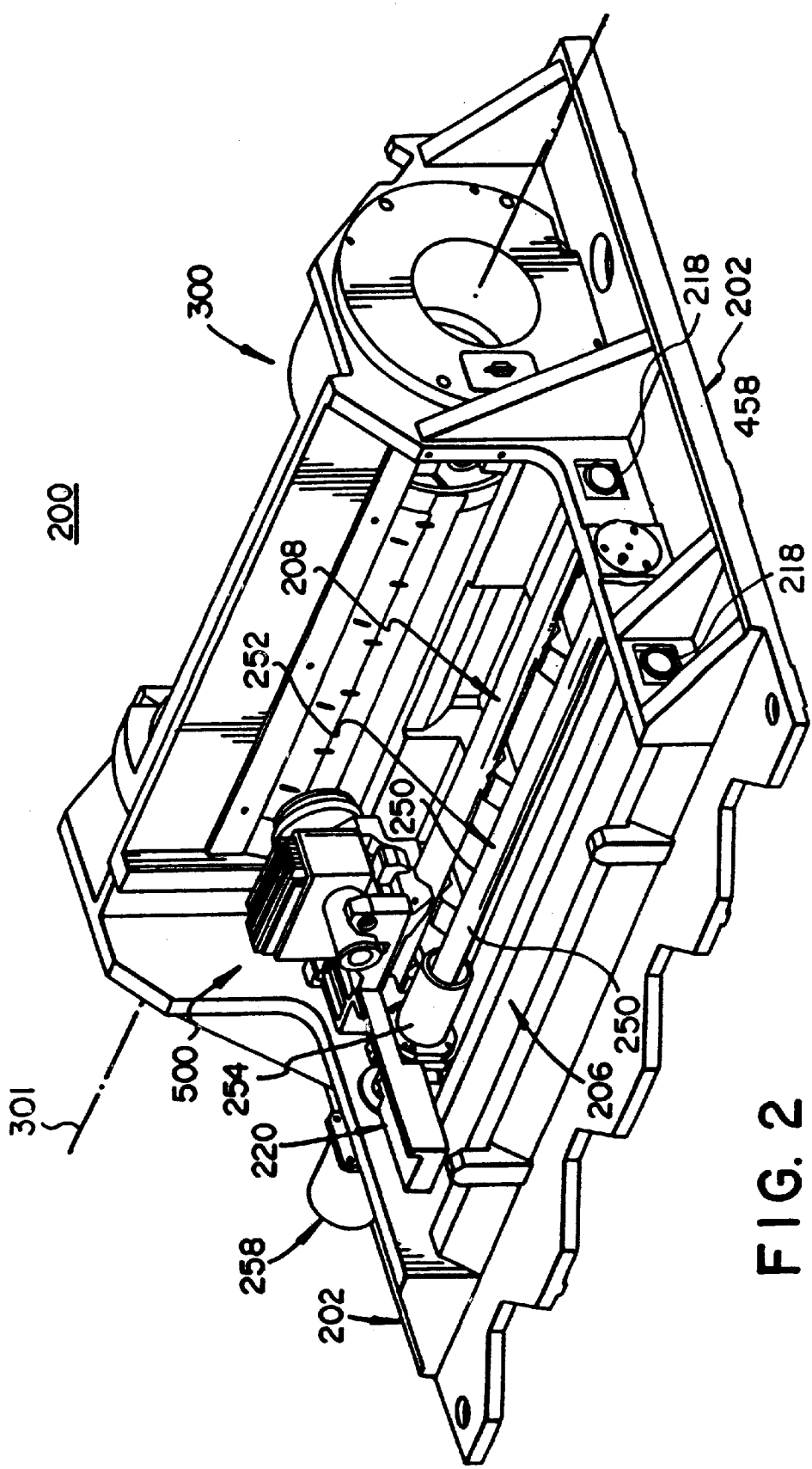
FIG. 2 shows a perspective view of a lathe bed scanning subsystem, or write engine, of the present invention.

Referring to FIG. 2, there is illustrated a perspective view of the lathe bed scanning subsystem 200 of the image forming apparatus 10, including the imaging drum 300, printhead 500 and lead screw 250 assembled in the lathe bed scanning frame 202. The imaging drum 300 is mounted for rotation about an axis 301 in the lathe bed scanning frame 202. In the preferred embodiment shown, the translation bearing rods 206, 208 are arranged parallel with axis 301 of the imaging drum 300, with the axis of the printhead 500 perpendicular to the axis 301 of the imaging drum 300. The printhead 500 is movable with respect to the imaging drum 300, and is arranged to direct a beam of light to the colorant donor sheet material. The beam of light from the printhead 500 for each laser 402 is modulated individually by modulated electronic signals from the image forming apparatus 10, which are representative of the shape and color of the original image, so that the colorant on the colorant donor sheet material is heated to cause volatilization only in those areas in which its presence is required on the thermal print medium 32 to reconstruct the shape and color of the original image.

The printhead 500 is mounted on a movable translation stage member 220 which, in turn, is supported for low friction slidable movement on translation bearing rods 206 and 208. The front translation bearing rod 208 locates the translation stage member 220 in the vertical and the horizontal directions with respect to axis 301 of the vacuum imaging drum 300. The rear translation bearing rod 206 locates the translation stage member 220 only with respect to rotation of the translation stage member 220 about the front translation bearing rod 208, so that there is no over-constraint condition of the translation stage member 220 which might cause it to bind, chatter, or otherwise impart undesirable vibration to the printhead 500 during the generation of an intended image.

The translation bearing rods 206, 208 are positioned and supported at their ends by rod support bores 218 in the outside walls 458 of the lathe bed scanning frame 202. Each rod support bore supports an end of a translation bearing rod. The rod support bores 218 are machined into the walls of the lathe bed scanning support frame 202 to allow adjustment of the translation bearing rods 206 and 208. The rod support bores 218 may comprise notches in an appropriate direction at one or both ends of the translation bearing rod. The notches are adapted for allowing adjustment of the translation bearing rods to compensate for manufacturing defects in the translation bearing rod.

A lead screw 250 is shown which includes an elongated, threaded shaft 252 which is attached to the linear drive motor 258 on its drive end and to the lathe bed scanning frame 202 by means of a radial bearing. A lead screw drive nut 254 includes grooves in its hollowed-out center portion for mating with the threads of the threaded shaft 252 for permitting the lead screw drive nut 254 to move axially along the threaded shaft 252 as the threaded shaft 252 is rotated by the linear drive motor 258. The lead screw drive nut 254 is integrally attached to the printhead 500 through the lead screw coupling (not shown) and the translation stage member 220 at its periphery so that as the threaded shaft 252 is rotated by the linear drive motor 258 the lead screw drive nut 254 moves axially along the threaded shaft 252 which in turn moves the translation stage member 220 and ultimately the printhead 500 axially along the vacuum imaging drum 300.

A digital imaging printer produces an image by changing the density at various locations on an image-recording medium as directed by electronically encoded data in an original-image file. A continuous-tone or "contone" image file is a fundamental type of original-image file typically composed of a sequence of data values called "pixels" each representing density, or some other visible quantity such as reflectance or transmittance which is convertible to image density, of a small area at a specific location on a typically square lattice of image samples. The lateral extent of the small area represented by that pixel is typically chosen to be near the limit of spatial resolution of the human visual system. A pixel is distinguished from finer spatial subdivisions utilized by the printer, such as "subpixels" or "micropixels", by the fact that each pixel provides information characterizing both the location and the amplitude of the density of a small area of the image. The location information for that pixel may be inferred from the placement of the encoded data for that pixel in the sequence of all of the data constituting that image. Each pixel should be capable representing any of the densities intended to be portrayed in that image.

Many techniques have been devised for printers to produce an image with gradations in density. The irradiance profile of an amplitude-modulated source can be scanned by the printer across a lattice of locations to deposit a variety of exposure levels on the image-recording medium in accordance with the data values for the sequence of pixels represented by the image file in order to print a contone image. A halftone rendering of the image can be produced by binary modulation of the source with pulses longer than the irradiance-FWHM traversal time but shorter than the time required for the irradiance profile to be scanned across the length of one pixel on the image-recording medium; the illusion of intermediate densities is created by varying the relative fraction of areas exhibiting each of the two halftone densities corresponding to the two exposure levels when these areas are smaller than the resolvable limit of vision or by physically mixing the densities with a density-profile-broadening mechanism such as dye diffusion in the image-recording medium.

The allocated area for a halftone dot is usually chosen to equal a pixel. The center-growing halftone dot used widely in the publishing industry subdivides the allocated area of each halftone dot into subpixels. The source is binary modulated to emit either its high power or its low power for the duration of scanning each subpixel, then either remains at the same power or toggles to the other binary level while scanning across the subsequent subpixel in accordance with a control map of the pattern of exposed and unexposed subpixels, called a "bitmap", corresponding to each possible data value for the pixels in the original contone-image file. Even though a subpixel is a potentially darkened area at a location in the rendered image, a subpixel is distinct from a pixel because any single subpixel cannot portray the density encoded by the original-image file at that location. The assembly of all of the subpixels in the allocated area of the halftone dot are required to portray the image density of that pixel.

Modulation of the radiation source can include control of the fraction of light transmitted or reflected by a modulating element subsequent to that radiation's generation by a radiation emitter. The combination of emitter and modulator can be considered to be the source.

Figure 3:
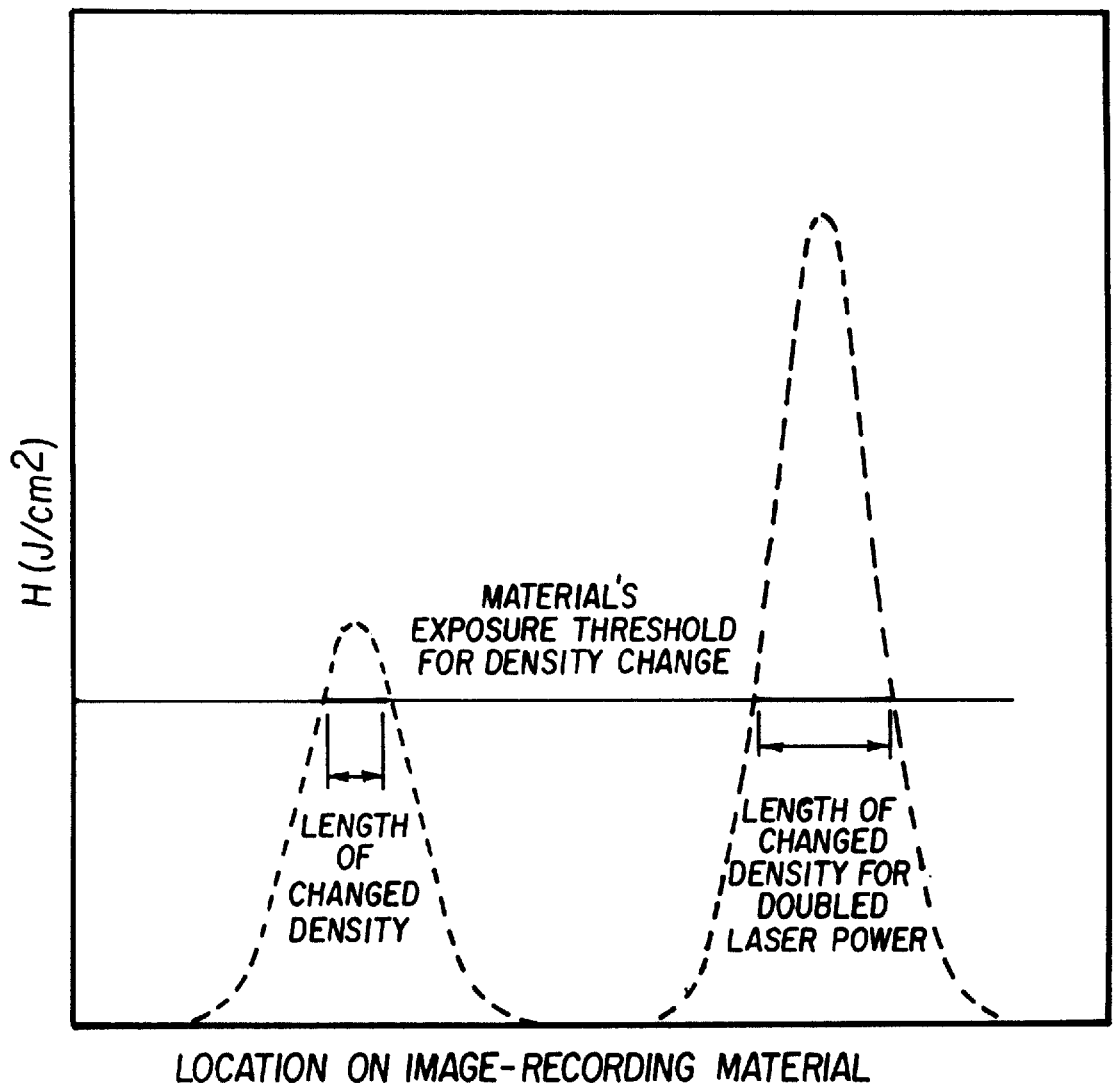
FIG. 3 shows exposure profiles deposited by the same source emitting two different powers in comparison with the medium's threshold for density change.

Variation of power emitted by a radiation source can produce artifacts of varying area-averaged density in halftones, even when printing on binary image-recording material that produces one density when the exposure remains below an imaging threshold and a second density at any location receiving exposure exceeding that threshold. As shown in FIG. 3 for two exposure profiles deposited on a binary image-recording material by the same irradiance shape but produced by twice the power from the source on the left as on the right, the lateral extent of the exposure profile exceeding the density-change threshold is wider for greater source power. The local density at the center of the exposure profile deposited by the lower power is the same as the local density at the center of the exposure profile deposited by the higher power due to the binary response of the image-recording material. But since the lateral extent of the density change increases for the higher power, accompanied by decreasing lateral extent of the background density, the density corresponding to the area-averaged transmittance or reflectance of an imaged area wider than the distance between successive pulsed exposures produced by the higher powered source differs from that produced by the lower powered source.

The exposure profile deposited by a binary modulated irradiation source whose irradiance profile is scanned with respect to an image-recording medium behaves according to one of two regimes depending upon the relative duration of the pulse compared to the time for the center of the irradiation profile to traverse its full-width at half maximum on the image-recording medium: amplitude-modulated exposure comparable to contone imaging for shorter pulses, and binary modulated exposure of halftone imaging for longer pulses as compared to the irradiance-FWHM traversal time.

Figure 4A:
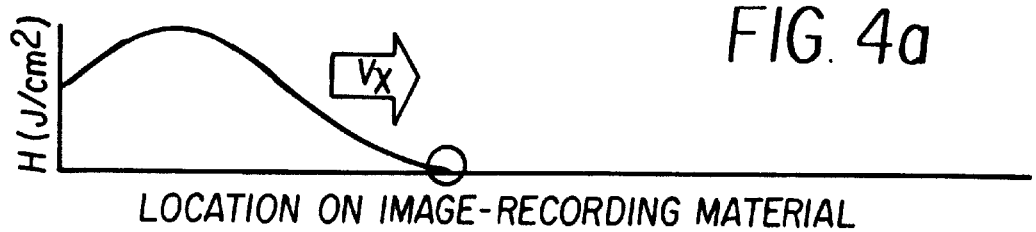
FIGS. 4a–4e show five instants of an activated exposure profile scanned across one location in image-recording medium.
Figure 4B:
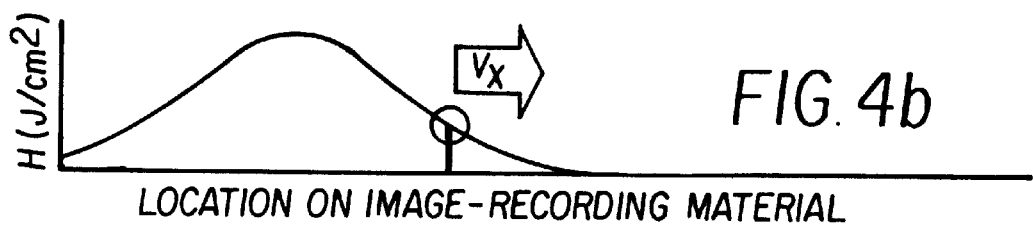
Figure 4C:
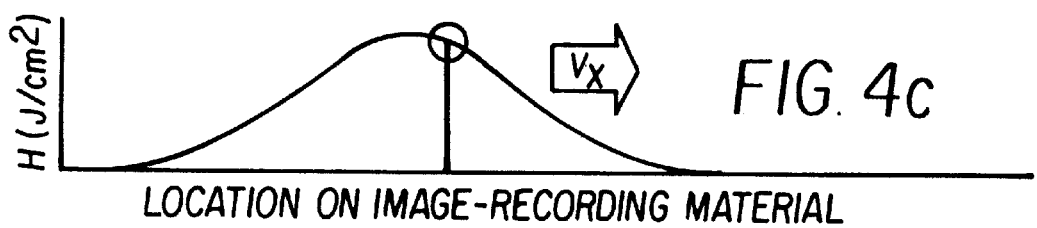
Figure 4D:
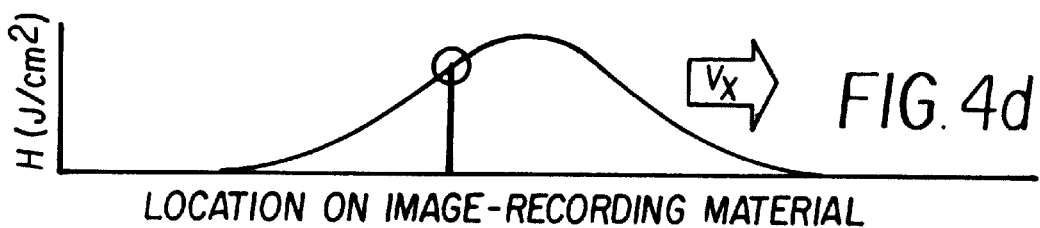
Figure 4E:
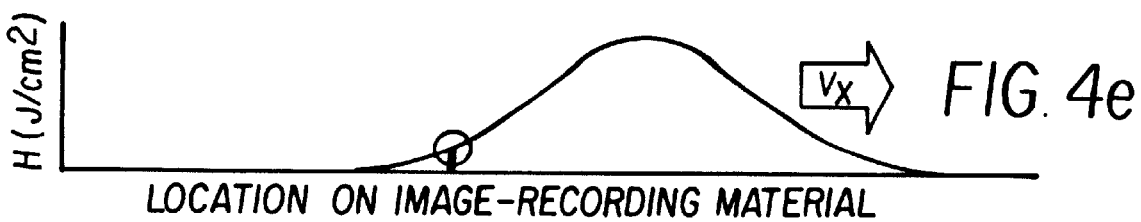

FIGS. 4*a*–4*e* depict five instants during scanning of a binary-modulated irradiance profile past a location on the image-recording medium. The source is activated throughout all five instants, implying that the pulse is longer than the irradiance-FWHM traversal time. The first instant as depicted in FIG. 4*a* and the last instant as depicted in FIG. 4*e* deposit negligible amounts of the exposure accumulated at the location of the image-recording medium beneath the encircled point of the irradiance profile. Changing the power emitted by the source at any instant either before the first instant or after the last instant depicted in FIGS. 4*a*–4*e* would not substantially affect the exposure accumulated at the location on the image-recording medium beneath the encircled point. The insensitivity of this location to preceding or subsequent source power demonstrates the contention that pulse duration cannot exert significant control of the exposure amplitude for pulse-widths longer than the irradiance-FWHM traversal time.

Figure 5A:
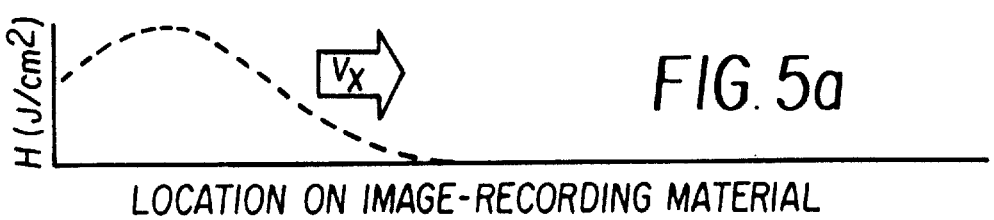
FIGS. 5a–5e show two instants during which one location is within full width at half maximum of an activated exposure profile scanned across the image-recording medium.
Figure 5B:
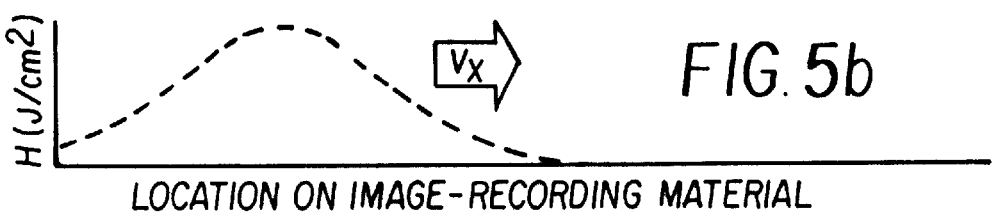
Figure 5C:
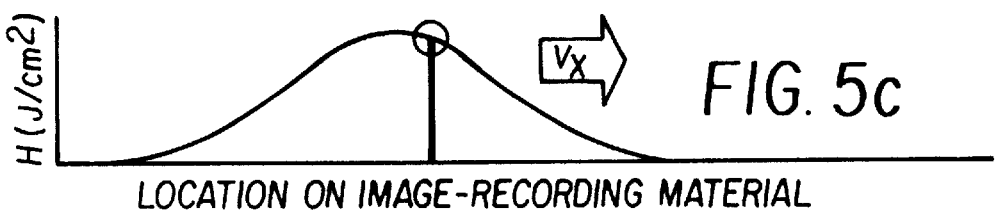
Figure 5D:
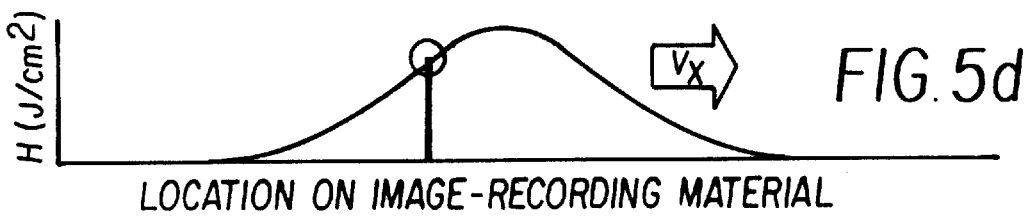
Figure 5E:
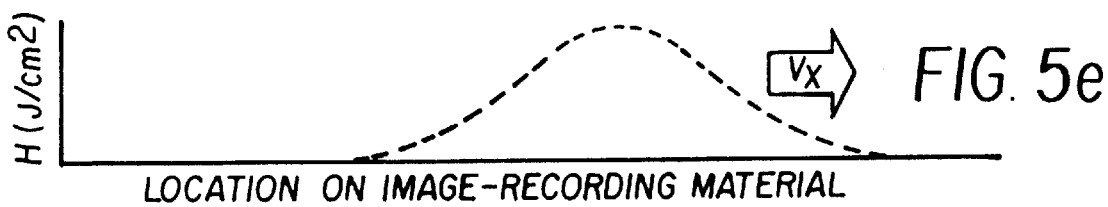

The pulse width in FIGS. 5a–5e are shorter than the irradiance-FWHM traversal time, lasting only from the instant depicted by FIG. 5c to the instant of FIG. 5d. The dotted irradiance profiles in of FIGS. 5a, 5b, and 5e show where the irradiance profile would have been projected onto the image-recording medium if the source were not extinguished by the pulse-width modulation. Changing the pulse duration would change the exposure deposited at the location beneath the encircled points. Control of the exposure amplitude exerted by pulse duration shorter than the irradiance-FWHM traversal time can be expressed quantitatively for the illustrative case of a radiation source emitting power $P_{beam}$ projected as an elliptical gaussian irradiance profile M[x,y] with standard-deviation radii $\sigma_{beam,x}$ along the scanning direction x and $\sigma_{beam,y}$ along direction y perpendicular both to the scan and to the propagation direction of the radiation:

$$M[x, y, t] = P_{beam} \frac{\exp\left[-\frac{1}{2}\left(\frac{x - x_{center,0} - V_x t}{\sigma_{beam,x}}\right)^2\right] \exp\left[-\frac{1}{2}\left(\frac{y - y_{center,0}}{\sigma_{beam,y}}\right)^2\right]}{\sigma_{beam,x}\sqrt{2\pi} \quad \sigma_{beam,y}\sqrt{2\pi}} \quad (1)$$

The peak is located at ($X_{center,0}$, $Y_{center,0}$) at time {t=0}. Scanning this irradiance profile at velocity $V_x$ with respect to the image-recording medium while activating this source at time $t_{on}$ and deactivating at time $t_{off}$ deposits the exposure profile:

$$H[x, y, t_{off} \le t \le t_{on}] = \frac{P_{beam}}{V_x \sigma_{beam,y} 2\sqrt{2\pi}} \exp\left[-\frac{1}{2}\left(\frac{y - y_{center,0}}{\sigma_{beam,y}}\right)^2\right] \quad (2)$$
$$\left\{\text{ERF}\left[\frac{x - x_{center,0} - V_x t_{on}}{\sigma_{beam,x}\sqrt{2}}\right] - \text{ERF}\left[\frac{x - x_{center,0} - V_x t_{off}}{\sigma_{beam,x}\sqrt{2}}\right]\right\}$$

at any observation time after the pulse ends at $t_{off}$. The error function is defined as:

$$\text{ERF}[v] = \frac{2}{\sqrt{\pi}} \int_{u=0}^{u=v} \exp[-u^2] du \quad (3)$$

The exposure H[pulse from $t_{on}$ to $t_{off}$] deposited at the location on the image-recording medium midway between the beam center's locations at the start and at the end of the pulse can be expressed as a fraction of the maximum exposure $H[t_{off}\text{-}t_{on}\to\infty]$ that could be deposited by an infinitely long pulse encompassing the same power and scanned at the same velocity:

$$\frac{H[\text{pulse}]}{H[t_{off} - t_{on} \to \infty]} = \text{ERF}\left[\frac{V_x \times \text{Pulse Duration}}{\sigma_{beam,x} 2\sqrt{2}}\right] \quad (4)$$

Since the full width at half maximum of a gaussian irradiance profile is:

$$\text{Irradiance } FWHM = \sigma_{beam} 2\sqrt{2 \ln[2]} \quad (5)$$

and since the time for a beam scanning at $V_x$ to traverse its full width at half maximum is:

$$\text{Irradiance } FWHM \text{ Traversal Time} = \frac{\text{Irradiance } FWHM}{V_x} \quad (6)$$

Figure 6:
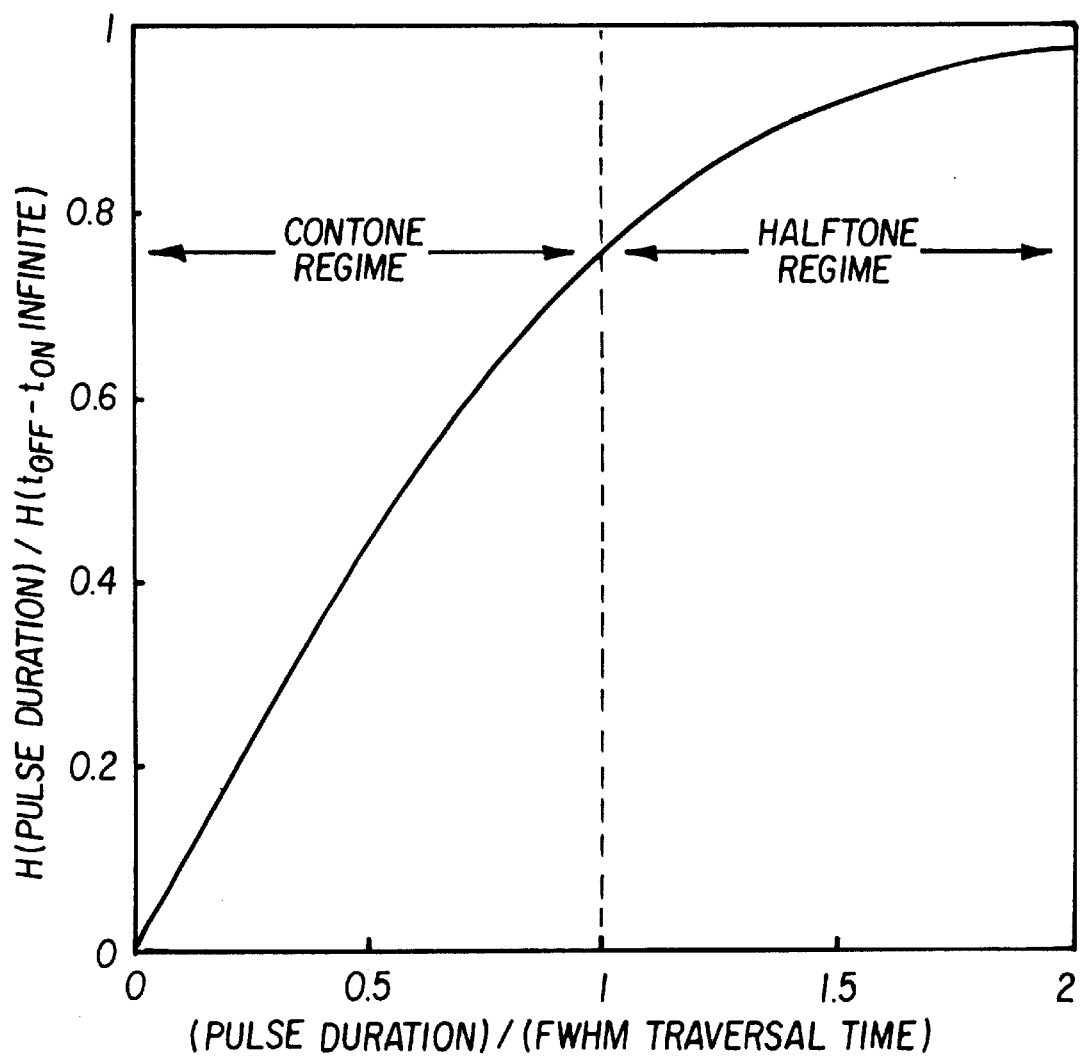
FIG. 6 shows exposure deposited midway between the beam center's positions at initiation of activation and at termination of activation.

Eq. (4) for the fraction of infinite-pulse-duration exposure in the illustrative case of a gaussian profile along the scanning direction becomes:

$$\frac{H[\text{pulse}]}{H[t_{off} - t_{on} \to \infty]} = \text{ERF}\left[\frac{\text{Pulse Duration}}{\text{Irradiance } FWHM \text{ Traversal Time}} \sqrt{\ln[2]}\right] \quad (7)$$

graphed in FIG. 6. The exposure amplitude increases linearly in the lower left of this plot for pulses much shorter than the irradiance-FWHM traversal time; this is labeled the "contone regime" since gradations of exposure can be deposited by a binary modulated source. The shallower, curving slope in the upper right of FIG. 6 for pulse duration greater than the irradiance-FWHM traversal time affords much less control and is labeled the "halftone regime" since only two levels predominate in the deposited exposure. At the criterion demarcating the contone regime from the halftone regime, 76% of the maximum available exposure is accumulated at the center location for this irradiance profile. Pulse durations longer than the irradiance-FWHM traversal time can add no more than one-third of the exposure acquired up to this point, and those contributions come at the expense of accelerating length of pulses.

Figure 7A:
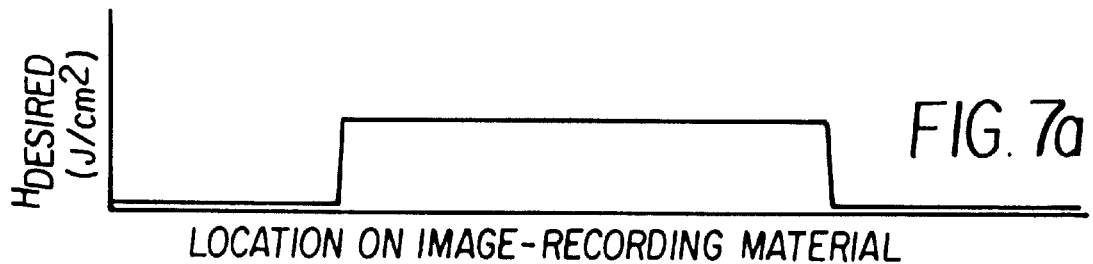
FIGS. 7a–7d show reproduction of a desired exposure profile by pulses of shorter duration than the time for the center of the irradiance profile to traverse its full width at half maximum on the image-recording medium.
Figure 7B:
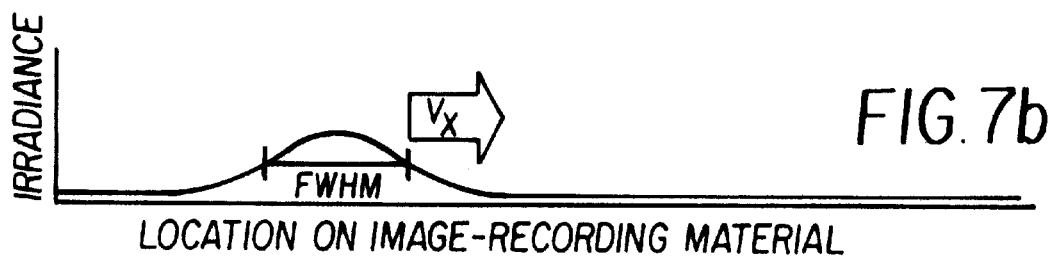
Figure 7C:
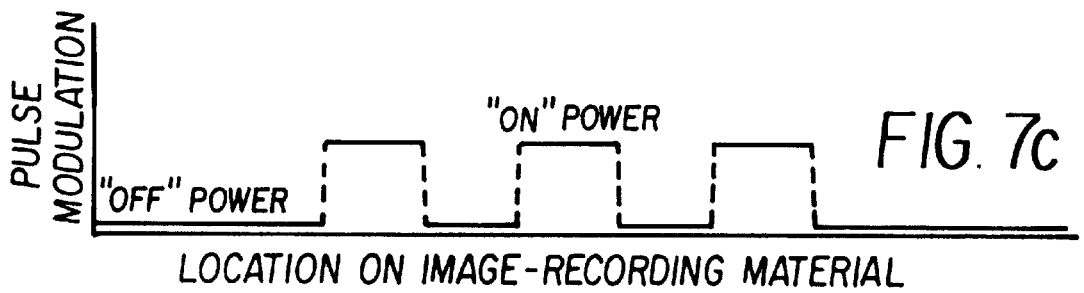
Figure 7D:
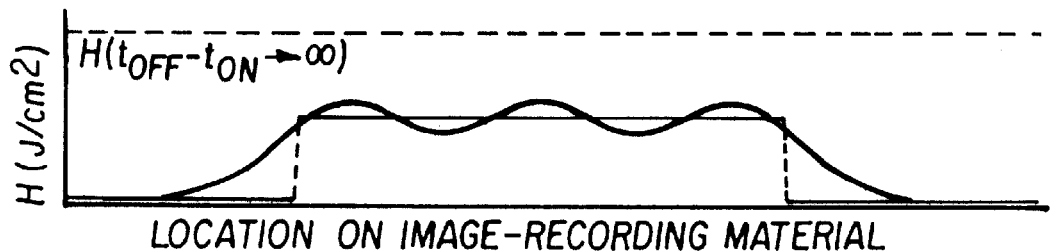

FIG. 7a depicts an exposure profile desired to be deposited on an image-recording medium along the scanning direction. FIG. 7b captures a slice through the center of the irradiance profile of the exposing beam at one instant during its scan along the image-recording medium. This irradiance profile is scanned in the direction indicated by the hollow arrow containing $V_x$. Its full-width at half maximum (FWHM) is delineated by the thick horizontal bar with vertical terminii. FIG. 7c shows the pulse modulation sequence activating the beam at each of its binary levels in order to deposit an exposure profile reproducing the one in FIG. 7a. This illustration of the pulse sequence specifically depicts on the vertical axis the power emitted by the source when the center of the irradiance profile is projected onto the location on the image-recording medium along the horizontal axis of FIG. 7c. The temporal criterion of "a pulse duration shorter than the irradiance-FWHM traversal time" can be restated in terms of distances as "the distance scanned by an activated beam's center shorter than that beam's irradiance-profile FWHM". The duration of an individual "ON" pulse in FIG. 7c is shorter than the FWHM bar in FIG. 7b; also, the duration of each "OFF" pulse is shorter than the FWHM in order to satisfy the criterion for exposure control by pulse-width modulation. FIG. 7d demonstrates that the exposure profile deposited by FIG. 7b's irradiance profile pulse-width modulated in the contone regime according to FIG. 7c and plotted as a thick solid curve can reproduce the desired exposure profile's amplitude and duration plotted as a dotted curve. The chain-dotted curve at the top of FIG. 7d is the maximum exposure $H[t_{off}\text{-}t_{on}\to\infty]$ as would be deposited by an infinitely long pulse applied to the same irradiance profile, beam power, and scan speed. The exposure profile deposited by the contone regime's short-pulse-modulated irradiance profile ripples modestly about the desired exposure profile but does not approach the upper limit of the infinitely long-pulsed exposure.

Figure 8A:
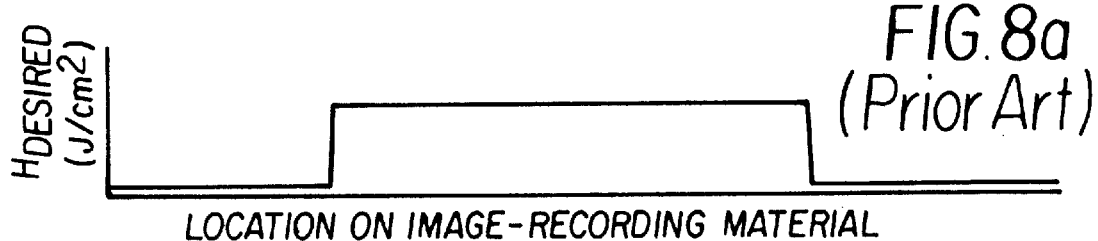
FIGS. 8a–8d show gaps in the exposure profile when reproduction is attempted with pulses of longer duration than the time for the irradiance profile to traverse its full-width at half maximum on the image-recording medium.
Figure 8B:
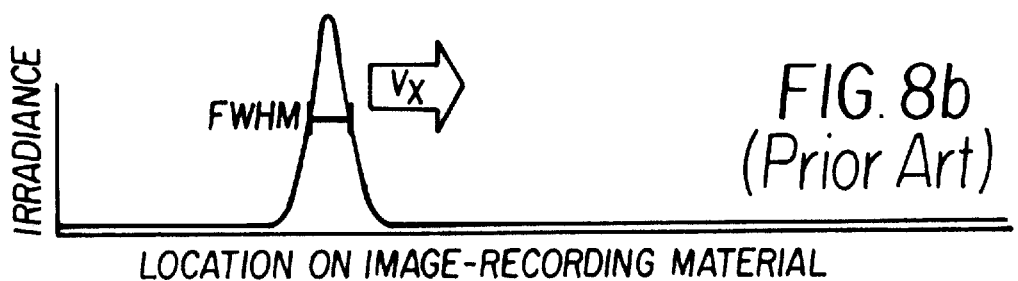
Figure 8C:
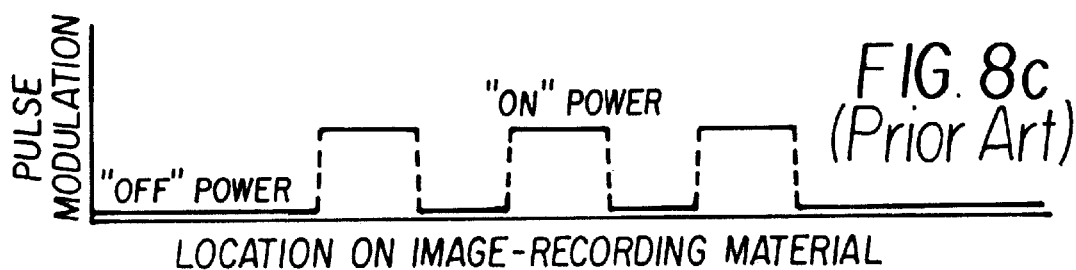
Figure 8D:
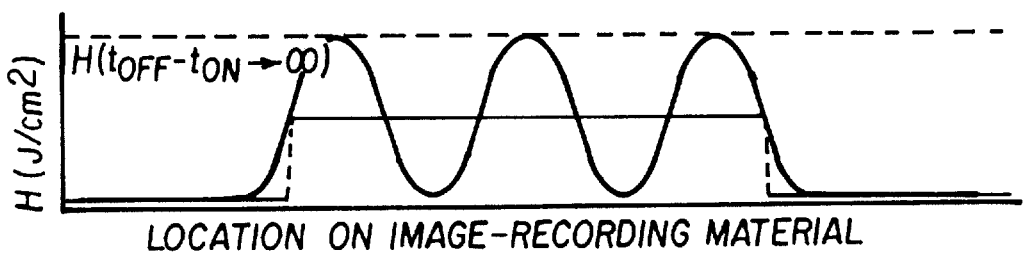

FIGS. 8a–8d is the analog for the halftone regime of the contone regime in FIGS. 7a–7d. FIGS. 8a–8d employ a narrower beam along the scanning direction in FIG. 8b so that than the distance scanned along the image-recording medium during the pulse-width duration schematized in FIG. 8c is longer than the irradiance profile's full-width at half maximum. Attempting to reproduce the desired exposure profile of FIG. 8a results in an exposure profile following the thick, solid curve in FIG. 8c with some locations receiving the maximum possible exposure $H[t_{off}\text{-}t_{on} \to \infty]$ separated by gaps of almost no exposure deposited on the image-recording medium. The actual exposure in the halftone regime rarely approximates the desired exposure at any location throughout the profile.

Figure 9A:
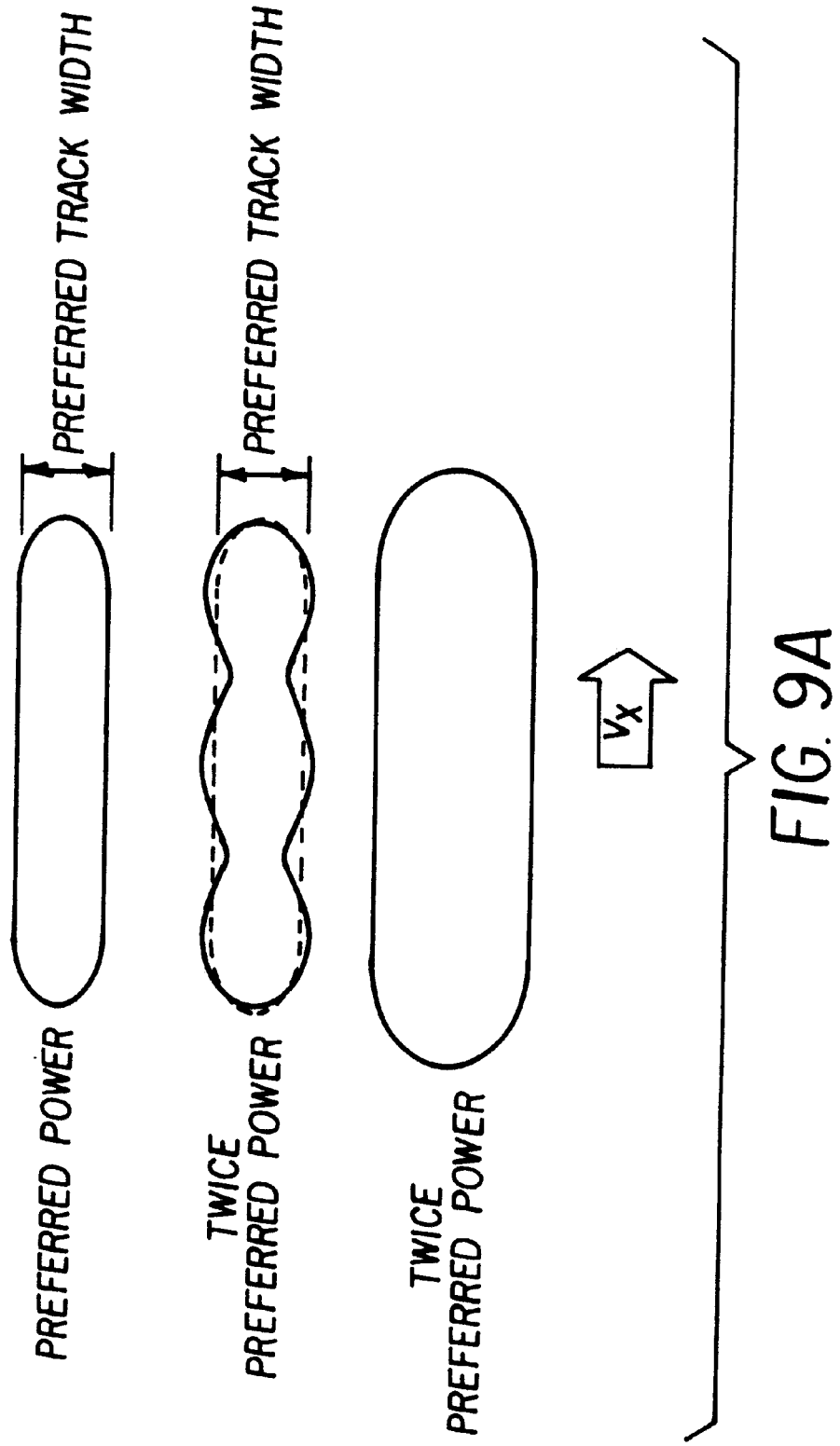
FIGS. 9a–9b are plan views of image density showing that track width can be adjusted by pulse durations shorter than the irradiance FWHM traversal time but not by pulses longer than that traversal time.

Pulse duration shorter than the FWHM traversal time enables modification of the image-track width perpendicular to the scanning direction, another capability unattainable by the halftone regime. FIG. 9a is a plan view of the loci of exposure exceeding the threshold for image-density change when deposited by three round irradiance profiles ($\sigma_{x,beam} = \sigma_{y,beam}$) all scanned along the x-direction from left to right across FIG. 9a and equally spaced between centers in the y-direction perpendicular to the scanning direction, i.e., down this Figure. All three beams have the same full-width at half maximum (FWHM,x=FWHM,y) as the beam in FIG. 7a. The top track is produced by the preferred beam power, while the middle and bottom tracks are produced by beams with twice the preferred power. The beam is activated continuously during the scan length of the desired exposure in FIG. 7a for both the top and bottom tracks, with the consequence that the bottom track written by the more powerful beam is wider in the direction perpendicular scanning than the preferred track width produced by the top, weaker beam. The middle track is modulated by the same pulse sequence as in FIG. 7c, so the pulse-width modulation is operating in the contone regime in which the distance scanned by the beam center while activated by a pulse is shorter than the irradiance-profile FWHM,x. The middle track width produced by this modulated beam of twice the preferred power, depicted as a solid thick curve, reproduces the smaller preferred track width, superimposed as a thin dashed curve. Ripples are evident in the modulated track about the preferred track in FIG. 9a, but the modulated track width remains narrower than the track width of its unmodulated beam throughout the scan length.

Figure 9B:
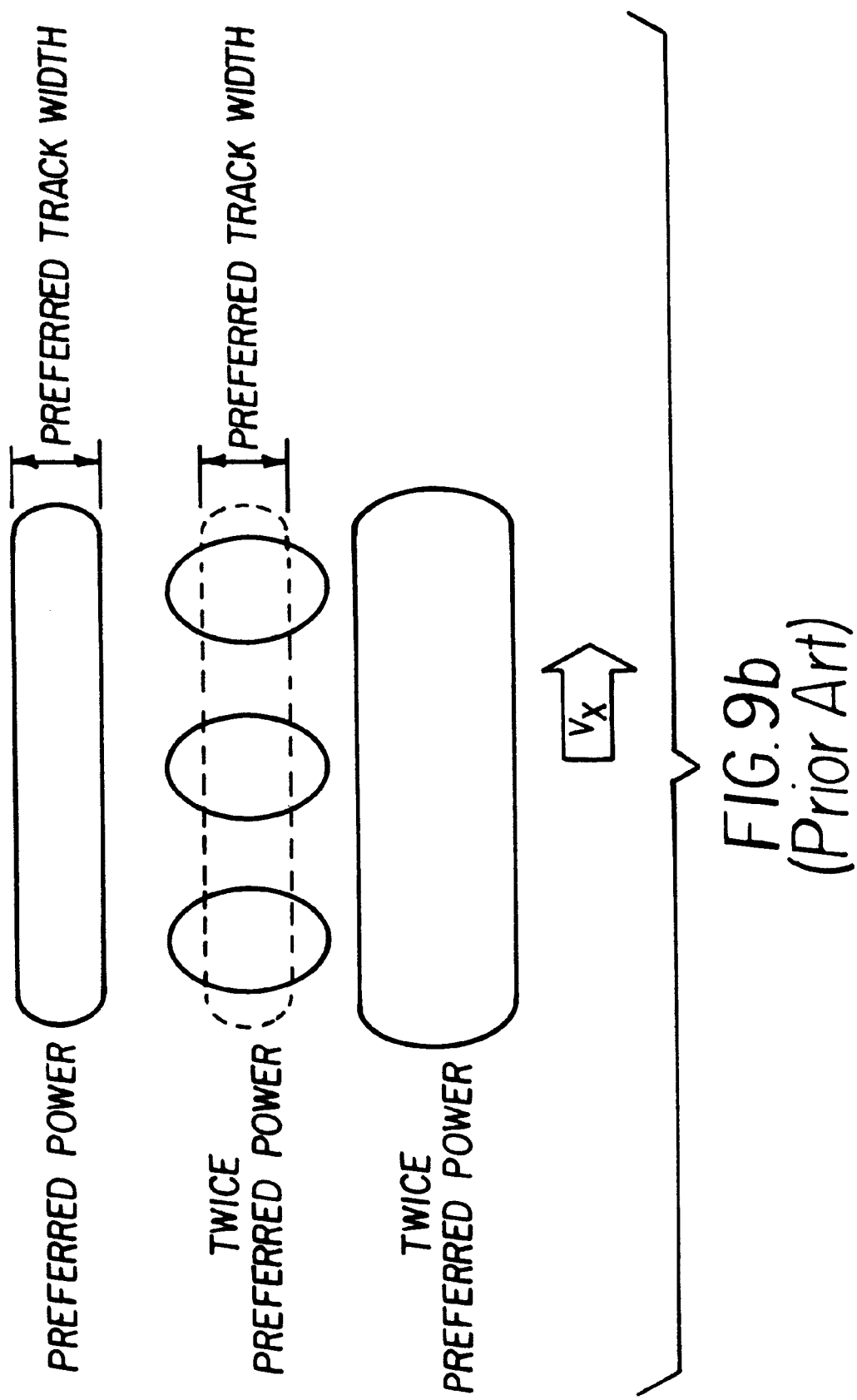

FIG. 9b presents the halftone analog of FIG. 9a. The irradiance profile is elliptical with shorter FWHM,x along the scanning direction than in FIG. 9a but with the same FWHM,y as in FIG. 9a perpendicular to the scanning direction. The irradiance profile along the scanning direction and consequent FWHM,x of the three beams in FIG. 9b are the same as in FIG. 8b. The middle and bottom beams emit twice the preferred power of the top beam. The top and bottom beams are unmodulated during the scan length of the desired exposure in FIG. 8a, while the middle beam is modulated according to FIG. 8c. The beam center scans farther than its FWHM,x during each modulating pulse, both "ON" and "OFF", so the modulation behaves according to the halftone regime. The middle track of the modulated beam is represented by the solid thick curves appearing as three ovals in FIG. 9b. The track width of these ovals is wider than the width of the preferred track, superimposed as a dashed curve, and the ovals are separated by regions with inadequate exposure to attain the density-change threshold. The track width of the beam modulated by pulses longer than its FWHM traversal time remains almost unchanged from the upper limit of track width for the infinitely long pulse of the more powerful beam at the bottom of FIG. 9b.

This ability of pulses shorter than the irradiance-FWHM traversal time to reduce the track width can be exploited in multiple-beam printers. Production of identical track widths is desirable to avoid streaking artifacts in images. If all irradiance profiles have identical FWHM,y perpendicular to the scanning direction but some sources emit more power, the track widths will vary among beams as illustrated by the top and bottom tracks in both FIGS. 9a and 9b. Modulating the more powerful beams with pulses shorter than their FWHM,x can reduce their track widths to match those of the weaker beams as illustrated by the middle track of FIG. 9a. If some irradiance profiles have different FWHM,y perpendicular to the scanning direction, those track widths can also be matched by modulating each beam by the appropriate pulses briefer than each FWHM,x traversal time. This method of adjusting track width can be especially beneficial for multiple light sources which cannot be amplitude modulated or which do not emit reproducible amounts of light when amplitude modulated. This method can also be useful with multiple sources that can only be addressed electronically by a binary signal, possibly due to space constraints, timing constraints, or expense of apparatus for implementing amplitude modulation.

The invention has been described in detail with particular reference to certain preferred embodiments thereof, but it will be understood that variations and modifications can be effected within the scope of the invention.

PARTS LIST

10. Image forming apparatus
12. Image processing housing
14. Image processor door
16. Ejection chute
18. Waste bin
20. Media stop
32. Thermal print media
34. Colorant donor material
50a. Lower sheet material tray
50b. Upper sheet material tray
52a. Lower media lift cam
52b. Upper media lift cam
54a. Lower media roller
54b. Upper media roller
56. Media guide
58. Media guide rollers
60. Media staging tray
80. Transport mechanism
100. Media carousel
110. Media drive mechanism
112. Media drive rollers
120. Media knife assembly
122. Media knife blades
180. Color binding assembly
182. Entrance door
184. Media exit door
200. Lathe bed scanning subsystem
202. Lathe bed scanning frame
204. Entrance passageway
206. Translation bearing rod
208. Translation bearing rod
218. Rod support bores
220. Translation stage member
250. Lead screw
252. Threaded shaft
254. Lead screw drive nut
258. Linear drive motor
300. Vacuum imaging drum
400. Laser assembly
402. Laser
404. Fiber-optic cables
406. Distribution block
458. Outside wall
500. Printhead

What is claimed is:

1. A method of controlling amount of material transferred from a medium by controlling exposure of said medium comprising the steps of:
   a) changing an emission level of a radiation source from a first power to a second power;
   b) emitting at said second power for less time than required by an irradiance profile to traverse a full-width at half maximum of said irradiance profile projected onto said medium along a direction of relative motion between said irradiance profile and said medium;
   c) changing said emission level to said first power; and
   wherein said first power is less than required to transfer material from said medium and said second power is sufficient to transfer material from said medium.

2. A method of controlling exposure of a medium as in claim 1 wherein a modulating signal generator changes said emission level.

3. A method of controlling exposure of a medium as in claim 1 wherein a translation assembly moves said irradiance profile relative to said medium.

4. A method of controlling exposure of a medium as in claim 1 wherein a translation assembly provides relative motion between said irradiance profile and said medium.

5. A method of controlling exposure of a medium as in claim 1 wherein a translation assembly moves said medium along the direction of relative motion with respect to said irradiance profile.

6. A method of controlling exposure of a medium as in claim 1 wherein an optical beam deflector moves said irradiance profile with respect to said medium.

7. A method of controlling exposure of a medium as in claim 1 wherein said radiation source is a laser.

8. A method of controlling exposure of a medium as in claim 1 wherein said radiation source comprises a laser and a modulator.

9. A method of controlling exposure of a medium as in claim 1 wherein said radiation source is composed of an emitter and a modulator.

10. A method of controlling exposure of a medium as in claim 1 comprising the additional steps of:
    d) emitting at said first power for less time than required by said irradiance profile to traverse said full-width at half maximum of said irradiance profile projected onto said medium along said direction of relative motion between said irradiance profile and said medium; and
    e) changing said emission level to said second power.

11. A printer for controlling exposure amplitude when printing onto a medium comprising:
    a radiation source for producing a radiation beam;
    a modulator for modulating said radiation beam between a first power level sufficient to produce image density in said medium and a second power level;
    a translation assembly for providing transverse relative motion between said radiation beam and said medium; and
    wherein said modulator maintains said radiation beam at said first power level for less time than required by an irradiance profile to traverse a full-width at half maximum of said irradiance profile projected onto said medium along a direction of relative motion between said irradiance profile and said medium, and at said second power level for less time than required by an irradiance profile to traverse a full-width at half maximum of said irradiance profile projected onto said medium along a direction of relative motion between said irradiance profile and said medium.

* * * * *